R. E. SARD AND H. P. G. NORSTRAND.
ELECTRIC RANGE AND KITCHEN CABINET AND BAKE OVEN.
APPLICATION FILED JUNE 21, 1917. RENEWED MAY 19, 1920.
1,365,345.
Patented Jan. 11, 1921.
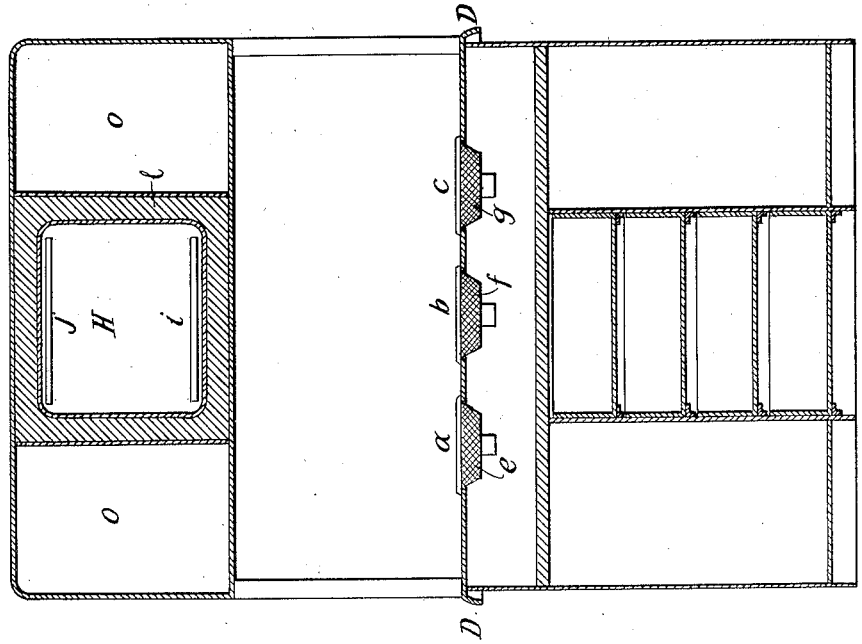
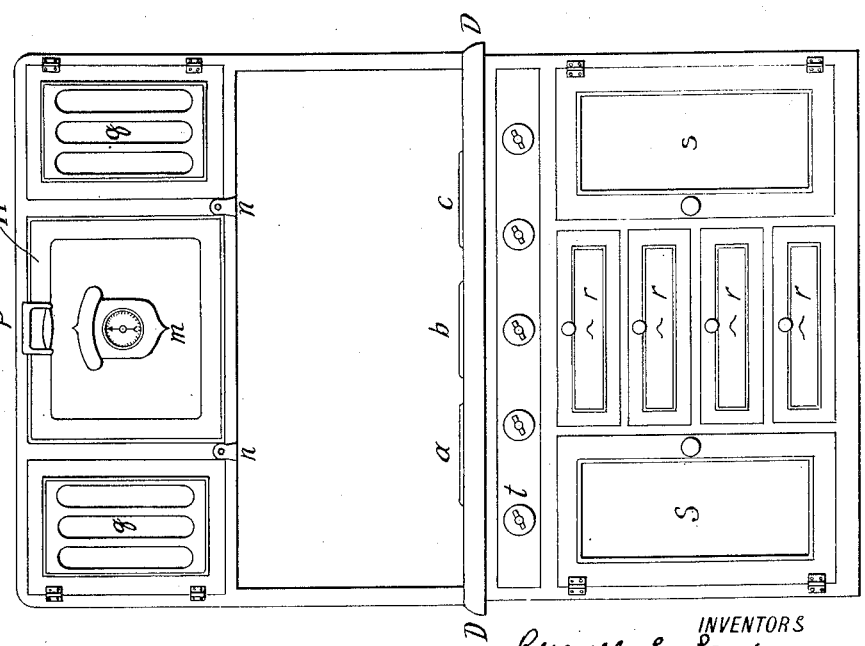

UNITED STATES PATENT OFFICE.

RUSSELL E. SARD AND HANS P. G. NORSTRAND, OF ALBANY, NEW YORK, ASSIGNORS TO RATHBONE SARD ELECTRIC COMPANY INC., OF ALBANY, NEW YORK, A CORPORATION OF NEW YORK.

ELECTRIC RANGE AND KITCHEN-CABINET AND BAKE-OVEN.

1,365,345.     Specification of Letters Patent.    Patented Jan. 11, 1921.

Application filed June 21, 1917, Serial No. 175,986. Renewed May 19, 1920. Serial No. 382,641.

*To all whom it may concern:*

Be it known that we, RUSSELL E. SARD and HANS P. G. NORSTRAND, citizens of the United States, residing at Albany, in the county of Albany and State of New York, have invented a new and useful Improvement in Electric Ranges and Kitchen-Cabinets and Bake-Ovens, of which the following is a specification.

Our invention relates to an electric range and kitchen cabinet with heating elements and bake oven insulated from the parts devoted to cabinet purposes. Our invention embodies economies of space and convenience to the housewife in having both cooking means and materials in a single container. In this art various combinations are used to obtain such results but our new improvement uses a bake oven as a part of the combination insulated from the cabinet, and thus gives baking or broiling convenience with cabinet facilities adjacent thereto and in connection therewith. Our improvement is, therefore, adapted to perform all requirements of the kitchen and to afford convenience and at the same time meet every demand made upon the ordinary kitchen cooking apparatus.

Our improvement is illustrated in the accompanying drawings:

Figure 1, is a front view.

Fig. 2, is a cross section of Fig. 1.

Similar letters refer to similar parts.

The table part DD has the heating elements $a$, $b$ and $c$ which are insulated by any suitable material from DD at the points $e$, $f$ and $g$, completely inclosing the said heating elements and preventing the spread of heat therefrom. The oven H has the heating element $i$ for baking purposes and the heating element $j$ for broiling purposes or both may be combined and is insulated from the cabinet portions at the points $l$ and is closed by the door M having hinges $n$ and handle $p$. The insulation of our oven from the cabinet portion makes use of the cabinet portion practical as it prevents the spread of the heat and enables one to use the cabinet without interference from the heat. The upper portion of the cabinet has the closet spaces $o$ closed by the doors $q$. The lower portion has suitable drawers $r$ and closets $s$ and current controls $t$ for all the heating elements used.

The foregoing describes a preferred form of our improvement but we appreciate that it can be used in different forms and our insulated oven may be used on the upper or lower parts of the improvement.

Having described our invention, what we claim is:

The combination of an electric range and a kitchen cabinet comprising a lower portion having a plurality of closets and drawers, table portion with electric heating elements adapted for cooking purposes disposed therein and insulated from the table portion, an upper portion containing a bake oven and broiler having electric heating means, a plurality of closet spaces, the oven and broiler insulated from the closet spaces and upper portion, and means for supplying and controlling electric current for cooking purposes.

RUSSELL E. SARD.
HANS P. G. NORSTRAND.

Witnesses:
  WM. E. PALMER,
  A. W. BLANCHARD.